United States Patent [19]

Gass et al.

[11] 3,743,946

[45] July 3, 1973

[54] VARIABLE FREQUENCY MULTIPLIER AND PHASE SHIFTER

[75] Inventors: Edward W. Gass; Fred W. Paramore, both of Duncan, Okla.

[73] Assignee: Halliburton Company, Duncan, Okla.

[22] Filed: June 11, 1971

[21] Appl. No.: 152,188

[52] U.S. Cl. .................. 328/110, 328/109, 328/127, 328/140, 328/147, 328/151, 328/38, 307/246

[51] Int. Cl. .............................................. H03k 5/20

[58] Field of Search .................... 328/141, 147, 140, 328/127, 110, 111, 151; 307/228, 246

[56] References Cited

UNITED STATES PATENTS

| | | | |
|---|---|---|---|
| 3,314,014 | 4/1967 | Perking | 328/151 X |
| 3,286,101 | 11/1966 | Simon | 328/151 X |
| 3,474,259 | 10/1969 | Rodgers | 328/151 X |
| 3,600,688 | 8/1971 | Booth | 328/111 |
| 3,659,117 | 4/1972 | Caveney et al. | 307/246 X |
| 2,602,151 | 7/1952 | Carbrey | 328/127 |
| 3,058,013 | 10/1962 | Acker | 307/228 |
| 3,322,973 | 5/1967 | Baldwin | 328/127 X |
| 3,518,558 | 6/1970 | Miller et al. | 328/140 |
| 3,573,637 | 4/1971 | Stebbins | 328/147 X |

*Primary Examiner*—John S. Heyman
*Attorney*—Burns, Doane et al.

[57] ABSTRACT

A method and apparatus for generating an output signal selectively displaced in phase from an input signal wherein the phase displacement remains the same irrespective of changes in the input signal frequency. A reference signal related in amplitude to the frequency of the input signal and a comparing signal which varies at a predetermined rate for a period of time related to the frequency of the input signal are compared, and a pulse is generated in response to the comparison. More specifically, a capacitor is charged and discharged from alternately enabled positive and negative constant current sources during successive interpulse periods of the input signal. The voltage on the capacitor is stored at the end of each charging period and the varying voltage across the capacitor is compared with one or more percentages of the stored voltage to generate output pulses. The output pulses may be combined with the input signal to provide frequency multiplication or the percentage may be made variable to provide variable phase shifting. A system for increasing the resolution of measurements obtained from a digital transducer and a system for generating selectively phase shifted control signals are also disclosed.

23 Claims, 7 Drawing Figures

INVENTORS
EDWARD W. GASS
FRED W. PARAMORE

BY Burns, Doane, Swecker & Mathis

ATTORNEYS

VARIABLE FREQUENCY MULTIPLIER AND PHASE SHIFTER

BACKGROUND OF THE INVENTION

The present invention relates to a method and apparatus for generating a periodic signal having a predetermined relationship with an input signal, and specifically, to a method and apparatus for generating pulses in a predetermined time relationship with the pulses in a series of pulses for frequency multiplication or phase shifting purposes.

It is often desirable to increase the repetition frequency of a periodic signal such as a sine wave or a series of pulses, particularly where the repetition frequency of the signal represents a sensed condition and a high degree of resolution is desired. For example, the flow of fluid through a conduit may be monitored by a turbine flowmeter which generates a series of pulses related in number to the volume of fluid flowing through the conduit. Each flowmeter is physically designed so that each pulse generated by the flowmeter represents a predetermined volume of fluid flowing through the flowmeter. This relationship between the fluid volume and the number of pulses generated by the flowmeter is called the meter factor of the flowmeter and is usually expressed in terms of pulses per gallon.

The resolution of any measurements obtained utilizing the output signal from a transducer of this type may not be affected to a great degree by the meter factor as long as the measurement is related to the absolute sum of the number of pulses generated by the transducer. However, where the signal from the transducer is either used as a gating signal or is itself gated by another signal to obtain a measurement of the sensed condition, the resolution of the measurement may vary significantly with the meter factor of the transducer.

For example, if the meter factor of the transducer is one pulse per gallon, and only one pulse is generated and counted during a selected time period, the actual volume flowing through the flowmeter during the selected time period may be anywhere from a nominal volume to slightly less than two full gallons. If the meter factor is increased to 100 pulses per gallon and 100 pulses are generated and counted over the same selected time period, the actual volume of fluid flowing through the flowmeter during the selected time period may be anywhere from 0.99 to 1.01 gallons. It can be seen from the above that by increasing the meter factor of a transducer such as a turbine flowmeter, the resolution of measurements obtained utilizing the transducer output signal may be significantly increased.

However, as was previously mentioned, the meter factor of a particular transducer may be a function of the physical design of the transducer. It may therefore be impractical to change the meter factor of the transducer, particularly a transducer already in service. One solution to this problem is to multiply the repetition frequency of the output signal from the transducer by a constant, thereby effectively multiplying the meter factor of the transducer by the same constant. For this technique to be effective, the multiplier must be capable of multiplying a signal which varies in frequency with the condition sensed. In addition, the period of the resultant multiplied signal must be substantially linearly related to the period of the transducer output signal. In other words, the time period between successive pulses of the transducer output signal may vary. However, in spite of this variation the multiplier must be able to symmetrically add the same number of pulses between adjacent pulses of the transducer signal. Moreover, to provide the versatility which may be required in condition monitoring systems, the multiplication factor of the multiplier should be readily variable over a wide range of even or odd integral values.

It is accordingly an object of the present invention to provide a novel method and apparatus for increasing the repetition frequency of a periodic signal.

It is another object of the present invention to provide a novel method and apparatus for increasing the repetition frequency of a periodic signal which varies in frequency in an unpredictable manner.

It is yet another object of the present invention to provide a novel method and apparatus for linearly adding pulses between adjacent pulses of a signal which is repetitive but variable in the rate of repetition.

It is a further object of the present invention to increase the resolution of measurements obtained from a condition responsive transducer by effectively increasing the meter factor thereof.

An increase in the repetition frequency may also be desirable where the signal is gated to recording means. For example, as in U.S. Pat. No. 3,566,685, issued Mar. 2, 1971, to Zimmerman et al. and assigned to the assignee of the present invention, the signal from a condition responsive transducer may be gated by another signal to provide a measurement of a condition. By increasing the gating or sampling rate of the signal from the condition responsive transducer and/or by increasing the repetition frequency of the gated signal, the resolution of the measurement may be increased as will hereinafter be described.

It is therefore still another object of the present invention to provide a novel method and apparatus for measuring fluid characteristics with increased accuracy.

It is still a further object of the present invention to provide a novel method and apparatus for linearly increasing the repetition frequency of one or both of the signals applied to a net oil analyzer to thereby increase the accuracy of the measurements obtained therefrom.

Another desirable application of the present invention is for the generation of a signal which is phase shifted or displaced with respect to an input signal by a selectable percentage of the period of the input signal wherein the percentage remains substantially constant regardless of changes in the frequency of the input signal. For example, a position sensor on a rotating member may provide an output pulse each time the member passes a certain position. It may be desirable to provide an output signal shifted in phase 90° (¼ revolution) from the position sensor output pulse to perform some function which must occur at that position of the rotating member.

A simple fixed delay can be used to obtain this phase relationship where the speed of rotation of the member is always constant. However, if the rotational speed changes and the delay remains fixed, the phase relationship between the signal from the position sensor and the desired output signal varies.

It is therefore yet a further object of the present invention to provide a novel method and apparatus for generating an output signal shifted in phase with respect to an input signal by a constant number of degrees irrespective of changes in frequency.

Yet another desirable application of the present invention is for the generation of a plurality of signals each selectively displaced in phase from a periodic input signal. For example, in machine control applications, a control cycle comprising several control functions may successively occur at different times in each cycle.

This may be accomplished by selecting a predetermined position of a moving member of the machine and keying the several control functions to the sensing of this position by delaying the output signal from a position sensor by different fixed amounts. Once again, if the speed of the moving member varies, the phase relationship of the delayed signals varies with respect to the position sensor output signal.

It is therefore still another object of the present invention to provide a novel method and apparatus for generating a plurality of signals, each selectively displaced in phase from a periodic input signal.

These and other objects and advantages of the present invention will become apparent to one skilled in the art to which the invention pertains from a perusal of the following detailed description when read in conjunction with the appended drawings.

THE DRAWINGS

DETAILED DESCRIPTION

A number of applications of the present invention are described hereinafter in connection with the appended drawings. In one application, the present invention is utilized to increase or multiply the frequency of a variable frequency periodic signal, particularly where increased resolution of a measurement obtained from a condition responsive transducer is desired. In another application, the present invention is utilized as a phase shift circuit to provide a constant phase relationship between an input signal and an output signal irrespective of changes in the frequency of the input signal. In a further application of the present invention, a desired number of signals having selectable phase relationships relative to a position responsive input signal may be generated to provide control signals at selected times in a control cycle.

FREQUENCY MULTIPLIER

Figure 1:
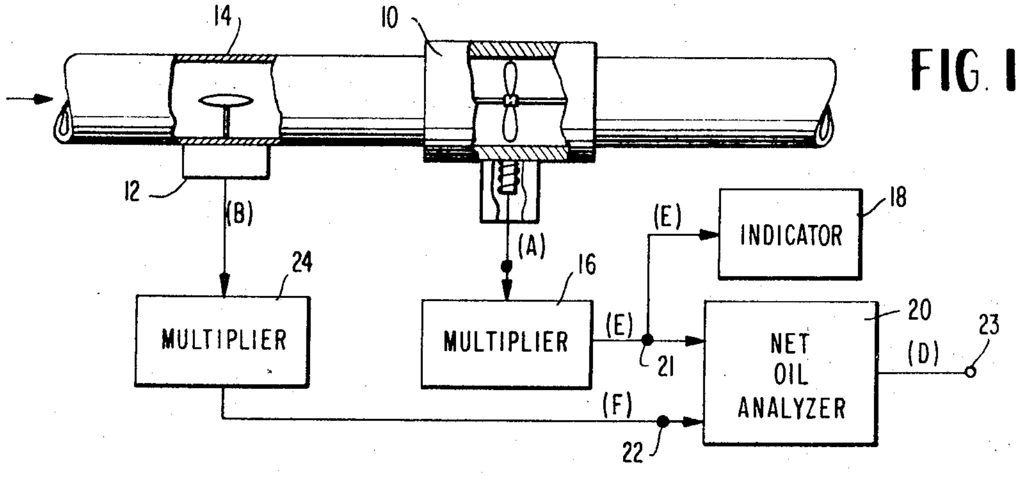
FIG. 1 is a functional block diagram of a metering system embodying the present invention.

Referring to FIG. 1 wherein a system embodying the present invention is illustrated, transducers 10 and 12 may be provided in a conduit 14 for monitoring various conditions of a fluid such as oil flowing through the conduit. The transducer 10 may be, for example, a turbine flowmeter of the type disclosed and claimed in U.S. Pat. No. 3,164,020 to Edward Groner et al. and assigned to the assignee of the present invention. The flowmeter provides a pulsed output signal in which the pulses are related in repetition frequency to the flow of fluid through the conduit. For example, the flowmeter 10 may generate a predetermined number of pulses for each gallon of fluid flowing therethrough. The transducer 12 may be a capacitive probe of the type disclosed and claimed in U.S. Pat. No. 3,523,245, to R. G. Love et al. and assigned to the assignee of the present invention. In the referenced love et al. probe, the frequency of the output signal from an oscillator is related to the constituency, i.e. the dielectric constant or oil/-water ratio, of the fluid flowing through the conduit 14. For example, the condition responsive transducer 12 may generate a signal having a frequency of 1,000 Hz. for a 50 percent mixture of oil and water.

The output signal from the flowmeter 10 may be applied through a multiplier 16 to both an indicator 18 and to one input terminal 21 of a net oil analyzer 20. The output signal from the transducer 12 may be applied to a second input terminal 22 of the net oil analyzer 20 via a second multiplier 24. The indicator 18 may be any suitable conventional gross fluid or flow rate indicator and the net oil analyzer 20 may be of the type described and claimed in Zimmerman et al. Letters U.S. Pat. No. 3,566,685, issued Mar. 2, 1971, and assigned to the assignee of the present invention. The disclosure of the Zimmerman et al. patent is hereby incorporated herein by reference.

Figure 2:
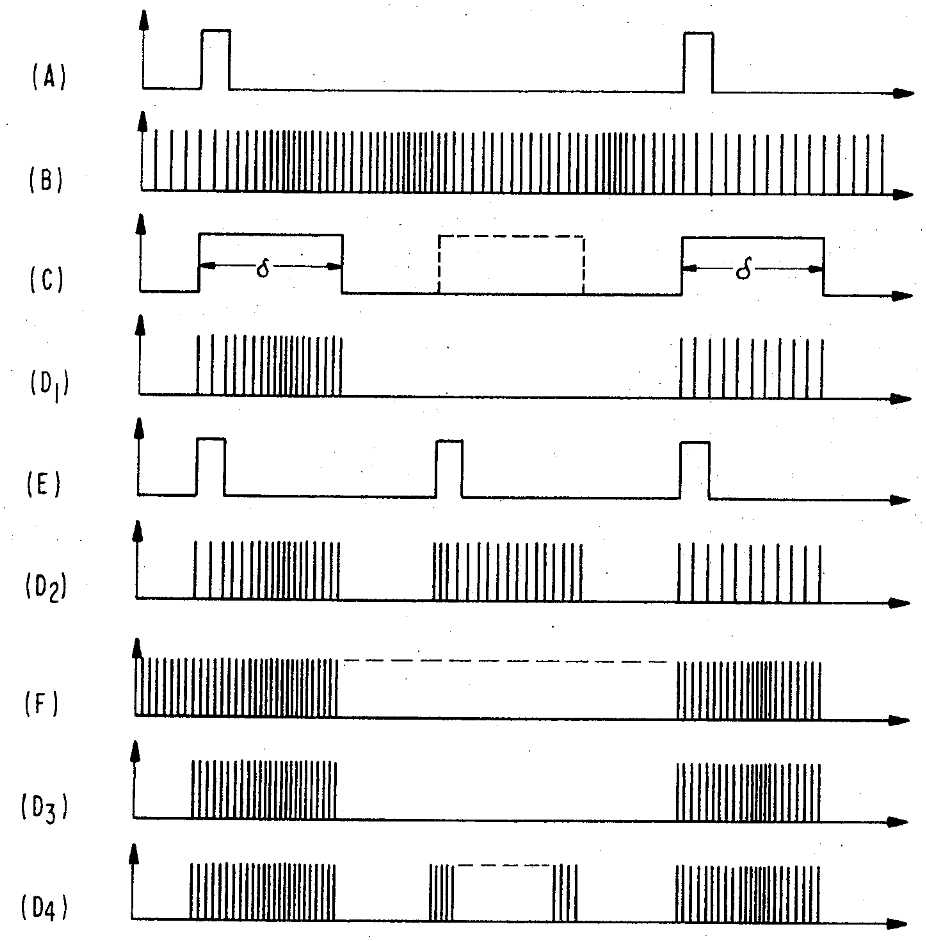
FIG. 2 is a graphical representation of various exemplary waveforms of the system of FIG. 1.

Assuming that the multipliers 16 and 24 are omitted from the circuit of FIG. 1, or that the multiplication factors thereof are both equal to one, the output signals from the flowmeter 10 and the condition responsive transducer 12 may be illustrated in waveform (A) and (B), respectively, of FIG. 2, after shaping in a conventional circuit (not shown).

As described in the above reference Zimmerman et al. patent, the net oil analyzer 20 utilizes the flowmeter 10 output signal to generate gating signals having a time duration $\delta$ as is illustrated in waveform (C) of FIG. 2. These gating signals are utilized to gate the signal from the transducer 12 to an output terminal 23 thereby providing packets of pulses as shown in waveform ($D_1$) in which the number of packets is related to fluid flow and the number of pulses in each packet is related to a condition of the fluid.

Since the net oil measurement is related to the number of pulses in each packet of pulses, and since the number may vary rapidly as the constituency of the fluid varies, the resolution and resultant accuracy of the net oil measurement may be increased in two ways. First, as is shown respectively in FIG. 2 by waveforms (E) and ($D_2$), the repetition frequency of the flowmeter 10 output signal may be increased by utilizing the multiplier 16 of FIG. 1 and making the multiplication factor thereof greater than one. One or more pulses may then be added intermediate the adjacent flowmeter output pulses. This pulse addition or frequency multiplication increases the rate at which the signal from the condition responsive transducer 12 is sampled, thereby providing a greater number of packets of pulses for a given fluid flow and a more accurate indication of the net oil.

Secondly, as is shown respectively in waveform (F) of FIG. 2, the repetition frequency of the signal from the condition responsive transducer 12 may be increased by utilizing the multiplier 24 of FIG. 1 and making the multiplication factor thereof greater than one. This frequency multiplication increases the number of pulses in each packet of pulses thereby increasing the resolution of each of the packets of pulses (waveform $D_2$) and increasing the accuracy of these net oil measurements. Thus, increased accuracy may be obtained by employing either or both of the multipliers 16 and 24 of FIG. 1. When both of the multipliers are utilized, both the number of packets and the number of pulses in each packet may be increased as illustrated in waveform ($D_3$).

Figure 3:
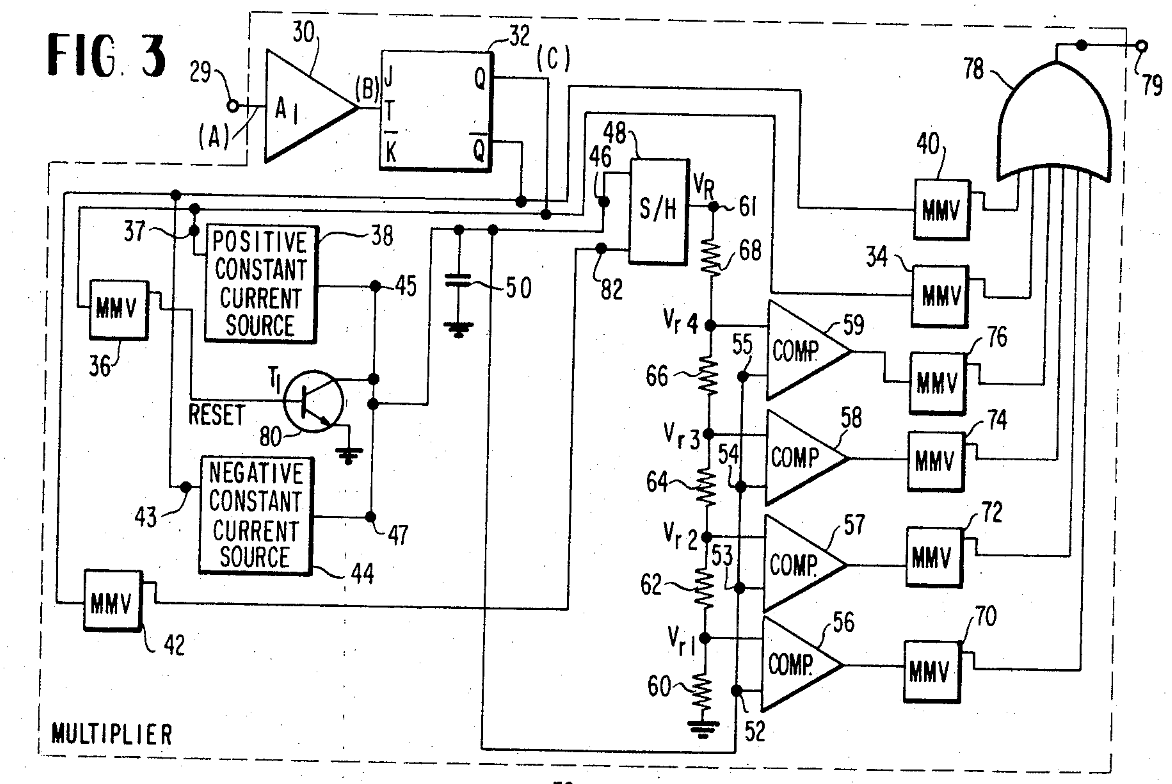
FIG. 3 is a functional block diagram of the multiplier of FIG. 1.

One of the multipliers 16 and 24 of the present invention is illustrated in greater detail in FIG. 3 to facilitate an understanding of the present invention. Referring now to FIG. 3, the output signal from the flowmeter 10 or from the transducer 12 of FIG. 1 may be applied from an input terminal 29 through a suitable, conventional,shaping amplifier 30 to the trigger input terminal of a conventional J-K flipflop 32.

The true or Q output terminal of the flipflop 32 is connected to the trigger input terminal of a monostable or one shot multivibrator 34, to the trigger input terminal of a monostable or one shot multivibrator 36, and to the input terminal 37 of a suitable conventional positive constant current source 38. The false or $\overline{Q}$ output terminal of the flipflop 32 is connected to the trigger input terminals of monostable or one shot multivibrators 40 and 42 and to the input terminal 43 of a suitable conventional negative constant current source 44. The current sources 38 and 44 are desirably identical except for the difference in the polarity of the output currents therefrom.

The output terminals 45 and 47, respectively, of the current sources 38 and 44 are connected together and to an input terminal 46 of a suitable conventional sample and hold circuit 48. The input terminal 46 of the sample and hold circuit 48 is grounded through a capacitor 50 and is also connected to one input terminal 52–55 respectively of a plurality of suitable conventional voltage comparators 56–59.

The output terminal 59 of the sample and hold circuit 48 may be grounded through a plurality of substantially identical, series connected resistors 60-68 which form a voltage divider network. The resistor 60-resistor 62 junction is connected to a second input terminal of the comparator 52, the resistor 62-resistor 64 junction is connected to a second input terminal of the comparator 54, the resistor 64-resistor 66 junction is connected to a second input terminal of the comparator 56, and the resistor 66-resistor 68 junction is connected to a second input terminal of the comparator 58. The output signals from the comparators 56-59 are applied, respectively, to the trigger input terminal of an associated monostable or one shot multivibrators 70–76 and the true output terminals of the one shot multivibrators 70–76 are connected to respective input terminals of a six input terminal OR gate 78 where output terminal 79 may be the output terminal of the multiplier.

The true output terminals of the one shot multivibrators 34 and 40 are also connected to respective input terminals of the OR gate 78. The true output terminal of the one shot multivibrator 36 is connected to the base electrode of a ground emitter NPN transistor 80, the collector electrode of which is connected to the sample input terminal 46 of the sample and hold circuit 48. The true output terminal of the one shot multivibrator 42 is applied to the strobe input terminal 82 of the sample and hold circuit 48.

Figure 4:
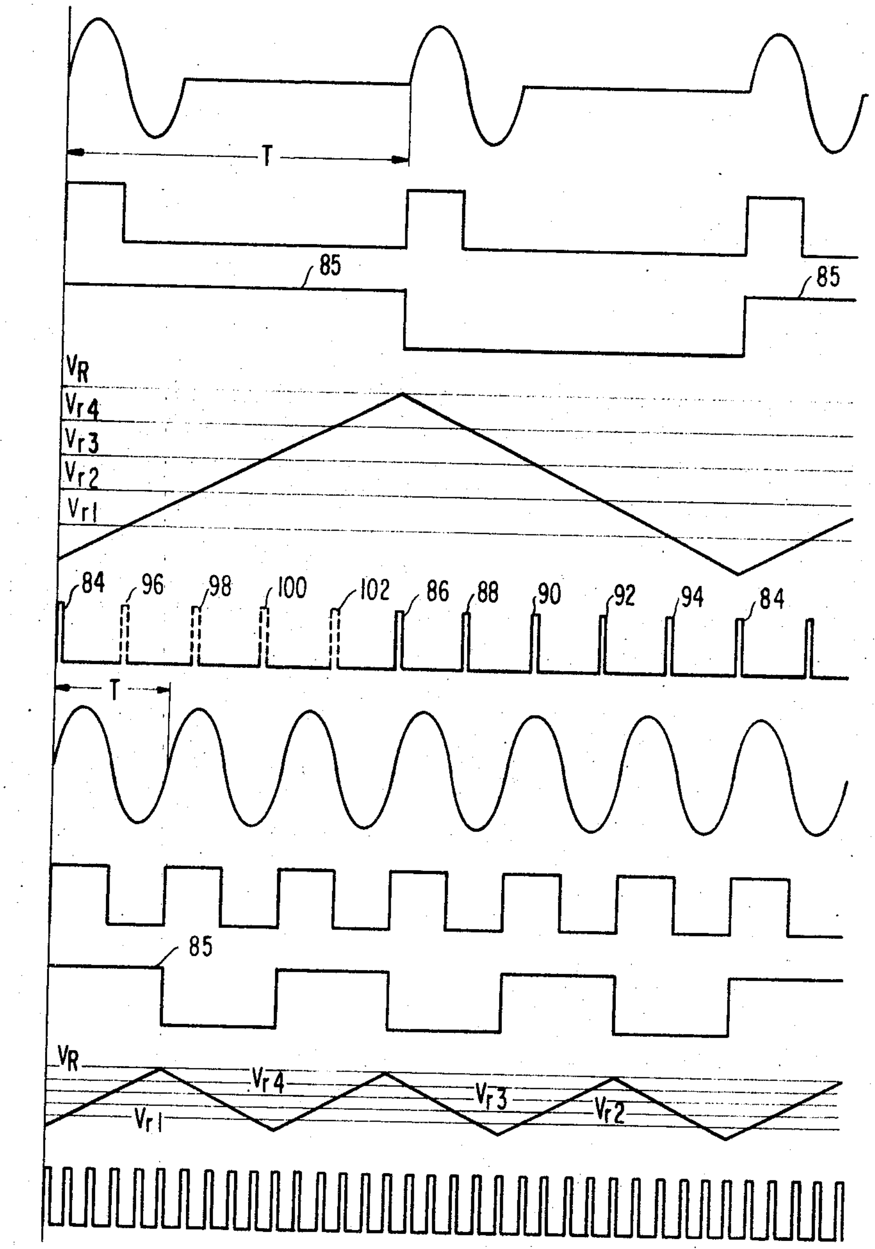
FIG. 4 is a graphical representation of various exemplary waveforms of the multiplier of FIG. 3.

The operation of the circuit of FIG. 3 may be more easily understood by referring to the typical circuit waveforms shown in FIG. 4. Referring now to FIGS. 3 and 4, the output signal from a transducer such as the flowmeter 10 of FIG. 1 (waveform A of FIG. 4) is applied to a shaping amplifier 30 which shapes the positive portion of the transducer output signal to provide a series of binary pulses as shown in waveform (B). The flipflop 32 is set and reset by consecutive pulses from the shaping amplifier 30 thereby generating the signal illustrated in waveform (C) of FIG. 4 at the true output terminal of the flipflop and the complementary signal (not shown) at the false output terminal thereof. The binary ONE output signal from the true output terminal of the flipflop 32 is utilized to trigger the one shot multivibrator 34 which in turn generates a pulse passed through the OR gate 78 as the pulse 84 in waveform (E) of FIG. 4.

The binary ONE output signal from the true output terminal of the flipflop 32 (waveform C) is also utilized to trigger the one shot multivibrator 36 and the resultant output pulse therefrom utilized to trigger the transistor 80 into conduction for a period of time sufficient to discharge the capacitor 50.

The current source 38 is turned on by the binary ONE signal from the true output terminal of the flipflop 32 and the capacitor 50 charges from the source 38 at a substantially linear rate for the duration of this binary ONE signal, i.e., for the period of the pulses indicated at 85 in waveform (C) of FIG. 4. Since the current source 38 is a constant current source, the charge on the capacitor 50 will always increase at the same linear rate and the voltage across the capacitor 50 will be directly related to the period of time during which the current source is conducting.

At the end of one cycle or period of the signal of waveform (B), the flipflop 32 is reset to trigger the one shot multivibrator 40. The one shot multivibrator 40 generates an output pulse which is passed by the OR gate 78 as the pulse 86 of waveform (E). The binary ONE output signal from the false output terminal of the flipflop 32 also triggers the one shot multivibrator 42 applying a strobe pulse to the sample and hold circuit 48 thereby causing the sample and hold circuit 48 to store the value of the voltage then present on the capacitor 50.

The portion of waveform (E) of FIG. 4 described above illustrates the signal at the output terminal 79 of the multiplier (i.e. the output terminal of the OR gate 78) assuming that the first pulse in waveform (A) is the initial pulse generated by the transducer and therefore the first multiplier input pulse. There will be no pulses between the pulses 84 and 86 of waveform (E) during this first cycle of the multiplier input signal (waveform A) since the sample and hold circuit has no stored reference voltage to apply to the comparators 56–59.

With continued reference to FIGS. 3 and 4, the binary ONE output signal from the false output terminal of the flipflop 32 also triggers the negative current source 44 into conduction causing the capacitor 50 to discharge at the same linear rate as the capacitor was charged. The stored value of sampled output voltage from the terminal 62 of the sample and hold circuit 48 is applied across the voltage divider network comprising the resistors 60-68 and the voltages then applied to the comparators 56–59 from the voltage divider network are substantially equal, incremental percentages of the stored or sampled voltage. For example, if the sampled voltage on the terminal 59 is 10 volts, the voltage applied to the reference input terminal of each of the comparators 56–59 would be, respectively, 2, 4, 6 and 8 volts, i.e. 20%, 40%, 60% and 80% of the sampled voltage.

Since the resistors 60 – 68 are equal in value, these percentages of the stored reference voltage applied to the comparators 56 – 59 from the resistor junctions differ from each other by an integral multiple of (100/*N*+1 ) % where N is the number of comparators and is also the number of pulses added between adjacent input pulses as will subsequently be described. This relationship may be expressed generally by the following equation:

$$\% = M\ (1/N+1)\ (100) \qquad (1)$$

Where $M = 1, 2, \ldots, N$.

The position of the comparator relative to the resistors 60 – 68 in the voltage divider network, i. e. the resistor junction from which the percentage of the reference voltage is applied to the comparator, determines the value of M in equation (1). For example, the percentage of the sample voltage applied to the comparator 56 of FIG. 3 is:

$$M\ (1/N+1)\ (100)\ \% = (1)\ (1/5)\ (100) = 20\% \qquad (2)$$

Likewise, the percentage of the stored reference voltage applied to the comparator 59 is:

$$M\ (1/N+1)\ (100)\ \% = (4)\ (1/5)\ (100) = 80\% \qquad (3)$$

While the percentages of the sampled reference voltage differ for each comparator, each percentage is always the same for a particular comparator as long as N remains the same. However, the reference voltage varies in amplitude as a function of the repetition frequency of the input signal to the multiplier circuit. This reference voltage $V_R$ may be expressed as:

$$V_R = K\ T \qquad (4)$$

where K is a constant equal to the value I of the current from the current source 38 divided by the value C of the capacitor 50, i. e. $K = I/C$, and where T is the period of the input signal applied to the multiplier (see waveform (A), of FIG. 4).

Thus, integral multiples of a constant percentage of the stored reference voltage $V_R$ of equation (4) are applied to the reference input terminal of each of the comparators 56 – 59. Each reference voltage applied to the comparators 56 – 59 may be generally expressed as:

$$V_{r_M} = V_R\ (M/N+1) = K\ T\ (M/N+1) \qquad (5)$$

As the capacitor 50 discharges due to the enabling of the negative current source 44, the voltage across the capacitor 50 decreases linearly as illustrated in waveform (D) of FIG. 4. This voltage $V_{R2}$ across the capacitor 50 during this discharge cycle may be expressed in terms of time $t$ by:

$$V_{R2} = V_I - Kt = KT - Kt = K(T-t) \qquad (6)$$

where $V_I$ is the initial capacitor voltage and where $t$ varies from 0 to $T$.

As this decreasing capacitor voltage passes each of the reference voltages applied to the comparators 59, 58, 57, and 56 in that order, the comparators trigger the associated one shot multivibrator 76 – 70, to generating an output pulse passed through the OR gate 78 as the pulses 88, 90, 92, and 94 respectively of waveform (E) of FIG. 4. The setting of the flipflop 32 by the next positive pulse of the input signal (waveform (A) ) will trigger the one shot multivibrator 36 to generating the second pulse 84 in waveform (E). The binary ONE output signal from the time output terminal of the flipflop 32 will also trigger the one shot multivibrator 36 to insure the complete discharge of the capacitor 50 and will enable the current source 38. The capacitor 50 then charges again and the voltage $V_{R2}$ applied to the comparitors from the capacitor 50 may be expressed as a function of time $t$ as:

$$V_{R2} = V_I + Kt = Kt \qquad (7)$$

The voltage $V_{R2}$ applied to the comparators may therefore be expressed generally for the charging and discharging cycles of the capacitor 50 as:

$$V_{R2} = V_I \pm Kt \qquad (8)$$

The reference voltage $V_R$ stored by the sample and hold circuit 48 is always related in amplitude to the period of the input signal, and the linearly increasing and decreasing voltage $V_{R2}$ developed across the capacitor 50 with which this reference voltage $V_R$ is compared is related in the same manner to the period of the input signal. The pulses 88 – 94 of waveform (E) of FIG. 4 are therefore linearly or symmetrically arranged between the pulses 86 and 84 which correspond in time to the positive excursions of the original input signal. The pulses 96 – 102 shown in phantom in waveform (E) are similarly symmetrically arranged between the pulses 84 and 86 and illustrate the output signal from the multiplier during the next cycle as the charge on the capacitor 50 increases to coincidence with the reference voltages $V_{r1} - V_{r4}$.

Another example of the operation of the multiplier circuit of the present invention is illustrated in waveforms (F) through (J) of FIG. 4. The input signal applied to the shaping amplifier 30 (a sinusoidal signal as shwon in waveform F) may be shaped or illustrated in waveform G and applied to the flipflop 32. The binary ONE output signals from flipflop 32 again cause the capacitor 50 to charge and discharge at the same rate (Kt) as with the previously described input signal. Since the period of the input signal of waveform (F) is shorther than that of waveform (A), the capacitor 50 charges to a lesser voltage than in the previous example. However, since the stored reference voltage $V_R$ from the sample and hold circuit 48 and the linearly varying voltage $V_{R2}$ on the capacitor 50 are both related in the same manner to the input signal, the same number of symmetrically spaced pulses are added between the positive pulses of the input signal.

The triggering of the transistor 80 into conduction prior to the commencement of each capacitor charging cycle insures that the capacitor 50 charges from the same initial point each time. Moreover, by making the period of the one shot multivibrators 34, 40 and 70–76 very short, the multiplier of FIG. 3 can operate at very high frequencies without any pulse overlap.

To further insure that there is no pulse loss due to overlap when the capacitor 50 is discharged by the triggering of the transistor 80, a current limiting resistor (not shown) may be placed in series with the collector or emitter electrode of the transistor. This resistor prevents the capacitor 50 from discharging instantenously thereby allowing more than one pulse to be generated during this discharge period if, for example, the capacitor 50 voltage is greater than the voltage $V_{r2}$ at the time the transistor 80 is triggered.

VARIABLE PHASE SHIFTER

Figure 5:
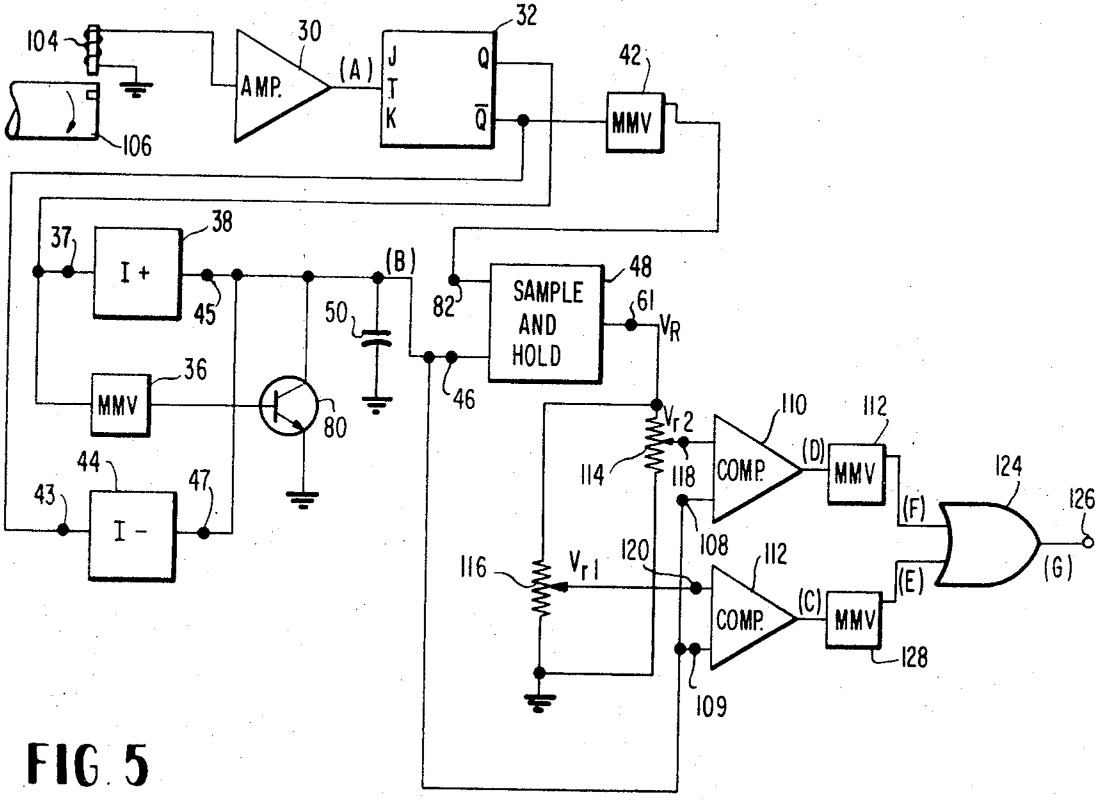
FIG. 5 is a functional block diagram of a variable phase shifter embodying the principles of the present invention.

Another embodiment of the present invention as utilized to obtain a desired phase shift of a variable frequency input signal is illustrated in the functional block diagram of FIG. 5.

Referring now to FIG. 5, the output signal from a magnetic or other suitable conventional position sensor 104 connected to a moving member such as a rotating shaft 106 may be applied through the shaping amplifier 30 to the trigger input terminal of the J-K flipflop 32.

The true output terminal of the flipflop 32 is connected to the trigger input terminal of the multivibrator 36 and to the input terminal 37 of the positive constant current source 38. The false output terminal of the flipflop 32 is connected to the trigger input terminal of the one shot multivibrator 42 and to the input terminal 43 of the negative constant current source 44.

The output terminals 45 and 47, respectively, of the current sources 38 and 44 are connected together and to the input terminal 46 of the sample and hold circuit 48. The input terminal 46 of the sample and hold circuit 48 is grounded through the capacitor 50 and is also connected to the "comparing" input terminals 108 and 109 of two suitable conventional Schmitt trigger circuits or other conventional voltage comparators 110 and 112 of the type which provide an output signal having a high signal level as long as the amplitude of the signal applied to the "comparing" input terminal exceeds the amplitude of the signal applied to the "reference" input terminal.

The output terminal 61 of the sample and hold circuit 48 may be grounded through two parallel connected potentiometers 114 and 116 and the pickoff arms of the potentiometers 114 and 116 may be connected, respectively, to the "reference" input terminals 118 and 120 of the comparators 110 and 112. The output signal from the comparator 110 is applied to the trigger input terminal of a conventional monostable or one shot multivibrator 122 which is triggerable by the negative going or leading edge of a pulse. The output signal from the true output terminal of the one shot multivibrator 122 is applied to one output input terminal of a two input terminal OR gate 124 and the output signal from the OR gate 124 is applied to an output terminal 126.

The output signal from the comparator 112 is applied to the trigger input terminal of a conventional monostable or one shot multivibrator 128 which is triggerable by the positive going or leading edge of a pulse. The output signal from the true output terminal of the one shot multivibrator 128 is applied to a second input terminal of the OR gate 124.

The true output terminal of the one shot multivibrator 36 is connected to the base electrode of the ground emitter NPN transistor 80, the collector electrode of which is connected to the sample input terminal 46 of the sample and hold circuit 48. The true output terminal of the one shot multivibrator 42 is applied to the strobe input terminal 82 of the sample and hold circuit 48.

Figure 7:
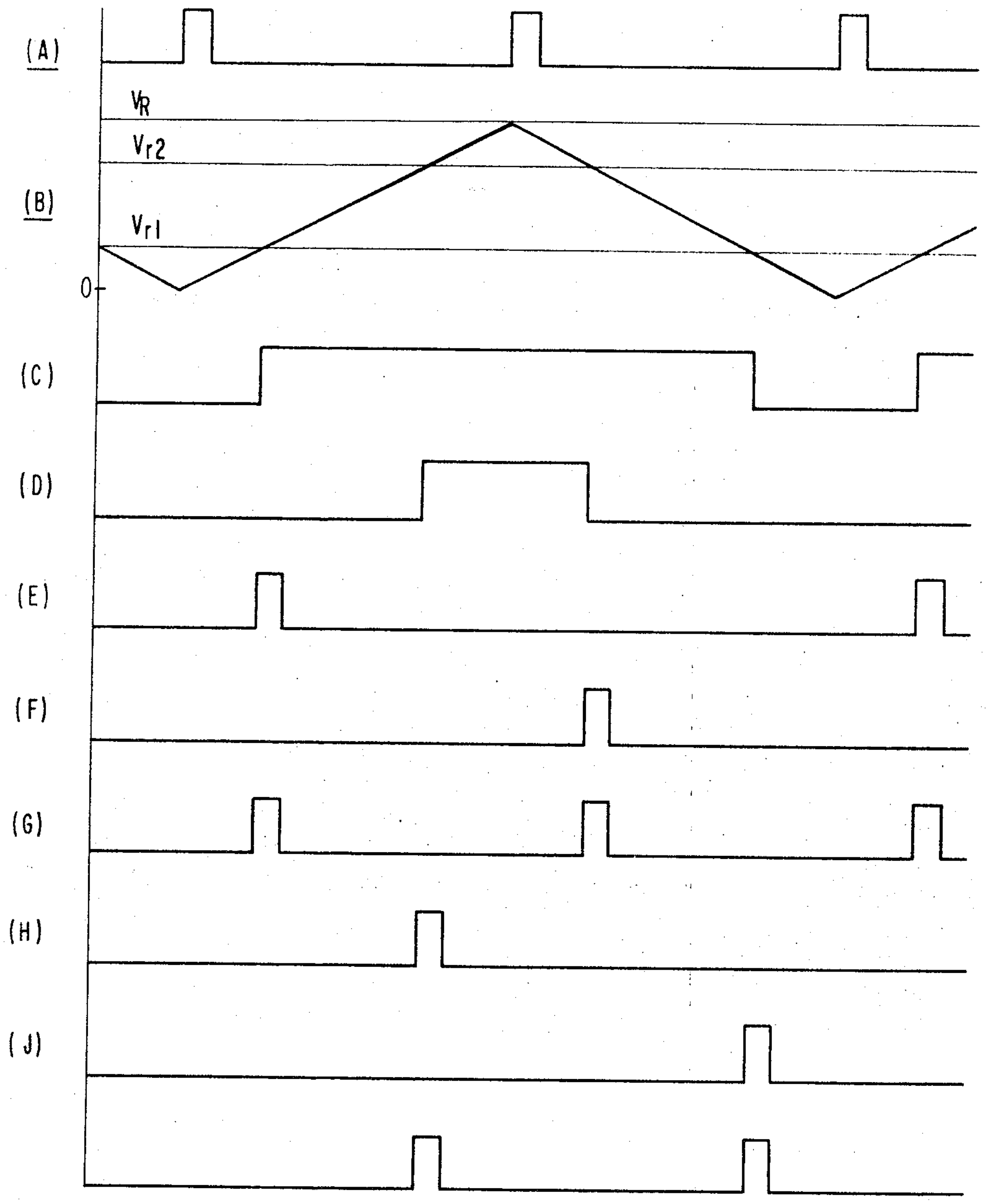

As was discussed in connection with the circuit of FIG. 3, the reference voltage $V_R$ related in amplitude to the period of the input signal (waveform A of FIG. 7) is provided at the output terminal 61 of the sample and hold circuit 48 and the increasing and decreasing comparing voltage $V_{R2}$ (waveform B of FIG. 7) developed across the capacitor 50 is provided at the input terminals 108 and 109 of the comparators 110 and 112.

The reference voltage $V_R$ is applied across the potentiometers 114 and 116 and any desired percentages of this voltage ($V_{r1}$ and $V_{r2}$) may be selected by positioning the arms of the potentiometers. For example, by positioning the arms of the respective potentiometers 116 and 114 approximately one quarter and three quarters of the way up from the grounded ends thereof, approximately 25 percent of the reference voltage $V_R$ is applied to the input terminal 120 of the comparator 112 and approximately 75 percent of the reference voltage $V_R$ is applied to the input terminal 118 of the comparator 110.

When the voltage applied to the input terminal 109 of the comparator 112 is approximately equal to 25 percent of $V_R$, i.e. is equal to the reference voltage $V_{r1}$, the comparator 112 output signal (waveform C of FIG. 7) assumes a high signal level and remains high until the capacitor 50 discharges below the amplitude of $V_{r1}$. The multivibrator 128 is triggered by the positive going as leading edge of the comparator 112 output signal providing an output pulse (waveform E of FIG. 7) at the true output terminal thereof which is phase shifted approximately 90° with respect to the input signal.

The output signal from comparator 110 (waveform D of FIG. 6) switches to a high signal level when the voltage developed across the capacitor 50 and applied to the input terminal 108 of the comparator 110 is approximately 75 percent of the reference voltage $V_R$, i. e. is equal to the reference voltage $V_{r2}$. The comparator 110 output signal then switches back to a low signal level at this same 75 percent point during the discharge cycle of the capacitor 50. The trailing or negative going edge of the comparator 110 output signal of waveform (D) triggers the multivibrator 112 generating an output pulse (waveform F of FIG. 7).

The pulses generated by the multivibrator 128 occur 90° or ¼ cycle after every other input pulse. The pulses generated by the multivibrator 112 occur 90° or ¼ cycle after the remaining, intermediate input pulses. By combining the signals from the multivibrators 122 and 128 with the OR gate 124, the output signal at the output terminal 126 (waveform G of FIG. 7) is a series of pulses which are phase shifted with respect to the input signal by 90°.

Since the voltage $V_R$ and $V_{R2}$ are both related in amplitude to the period of the input signal, the phase relationship between the signal generated by the position sensor 104 and the signals at the output terminals of the multivibrators 128 and 122 will always remain substantially the same irrespective of changes in the frequency of the input signal. In the above example, the output signal will always be delayed or lag the input signal by approximately 90° or one quarter of a cycle where one cycle of the input signal represents 360° or one complete revolution of the rotating shaft 106.

SELECTABLE PHASE CONTROL SIGNAL GENERATOR

It may also be desirable to control several operations of a machine at selectable intervals after some moving member of the machine has reached a predetermined position. For example, each revolution of the shaft 106 of FIG. 5 may represent one control cycle of a machine. Control pulses may be required by way of example, to effect two or more different control functions exactly 90° and 270° after a pulse is generated by the position sensor 104.

Figure 6:
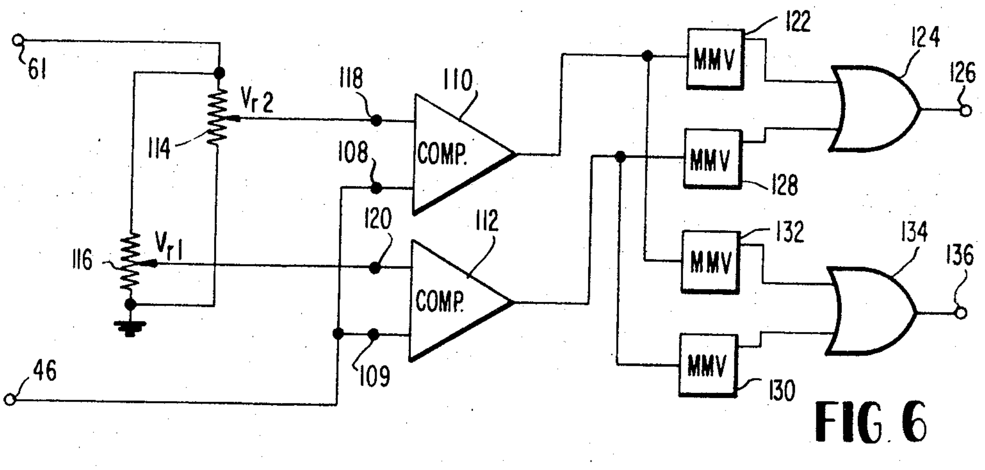
FIG. 6 is a functional block diagram of a variable phase shift, control signal generator embodying the principles of the present invention; and, FIG. 7 is a graphical representation of various exemplary waveforms of the circuits of FIGS. 5 and 6.

A circuit for generating a plurality of signals each selectively displaced in phase from an input signal is illustrated in FIG. 6. Referring now to FIG. 6, the reference voltage $V_R$ generated as was previously described is provided at the output terminal 59 of the sample and hold circuit 48 (FIG. 5). The linearly varying comparing voltage $V_{R2}$ developed across the capacitor 50 (FIG. 5) is provided at the terminal 46.

The reference voltage $V_R$ is applied across the parallel connected potentiometers 114 and 116 and the pickoff arms of the potentiometers 114 and 116 are connected to the respective input terminals 118 and 120 of the comparators 110 and 112 as was previously described. The comparing voltage $V_{R2}$ (waveform B of FIG. 7) is applied to the input terminals 108 and 109 of the comparators 110 and 112, respectively. The output signal from the comparator 112 (waveform C of FIG. 7) is applied to the trigger input terminal of the one shot multivibrator or 128 previously described and to the trigger input terminal of a suitable conventional one shot multivibrator 130 which is triggerable by the negative going or trailing edge of an applied pulse. The output signal from the comparator 110 (waveform D of FIG. 7) is applied to the trigger input terminal of the one shot multivibrator 122 previously described and to the trigger input terminal of a suitable conventional one shot multivibrator 132 which is triggerable by the positive going or leading edge of an applied pulse.

The output signals from the true output terminals of the multivibrators 122 and 128 (waveforms F and E, respectively, of FIG. 7) are applied to the two input terminals of the OR gate 124 and the output signal from the OR gate 124 (waveform G of FIG. 6) is provided at the output terminal 126 as previously described in connection with FIG. 5. The output signals from the true output terminals of the multivibrators 132 and 130 (waveforms H and I, respectively, of FIG. 7) are applied to the two input terminals of a two input terminal OR gate 134 and the output signal from the OR gate 134 (waveform J or FIG. 7) is provided at an output terminal 136.

With the circuit described above, two output signals (waveforms G and J of FIG. 7), selectively displaced in phase from the input signal (waveform A) are generated. It should be noted that these two output signals must be phase shifted from the input signal in a symmetrical manner, i.e. if the output signal at the output terminal 126 is shifted 90°, the output signal at the output terminal 136 must be shifted 270°. Likewise, if the output signal at the output terminal 126 is shifted 125°, the output signal at the output terminal 136 must be shifted 235°.

Independently phase shiftable output signals may be obtained by providing two potentiometers, two comparators, two multivibrators and an OR gate connected to the terminals 61 and 46 to form a second independent phase shifter. Additional independent phase shifters may be added in this manner if more than two selectively phase shiftable control signals are required. A suitable conventional driver amplifier may be provided between the output terminal 61 of the sample and hold circuit 48 and the potentiometers to prevent excessive loading of the sample and hold circuit 48.

Moreover, various combinations of the input signal and the output signals may be obtained by combining these signals through additional OR gates if such combinations are desired. For example, if a control function is to be effected in coincidence with the input signal and 90° later, the input signal and the signal at the output terminal 126 may be combined in a two input terminal OR gate (not shown).

ADVANTAGES AND SCOPE OF THE INVENTION

It can be seen from the above described exemplary embodiments of the present invention that numerous advantages result therefrom. For example, the repetition frequency of a periodic input signal may be increased by any desired integral amount by adding evenly spaced pulses to the signal during the interpulse period thereof. The spacing between the pulses of the resultant signal remains substantially the same irrespective of changes in the frequency of the input signal.

Moreover, the circuit of the present invention may be easily added to existing equipment to increase the resolution of measurements obtained from condition responsive sensors by way of example.

The present invention also provides extremely versatile variable phase shifting capabilities. Once a particular phase displacement has been selected, the selected phase shift remains constant with respect to the input signal although the frequency of the input signal changes.

The present invention may thus be embodied in other specific forms without departing from the spirit of essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus comprising:

means for generating a reference signal related in amplitude to the duration of one cycle of an input signal;

means for generating a comparing signal having an amplitude which varies at a predetermined rate for a period of time related in duration to the duration of a subsequent cycle of the input signal; and, means for generating an output pulse in response to the existence of a predetermined relationship between the amplitude of the comparing signal and the amplitude of the reference signal.

2. The apparatus of claim 1 wherein said means for generating said reference signal includes:

means for charging a capacitor at a predetermined rate for a period of time related to the duration of the period of said input signal; and, means for storing the voltage on said capacitor at the end of said period of time.

3. The apparatus of claim 2 wherein said means for generating said comparing signal includes means for charging and discharging said capacitor at said predetermined rate for said period of time.

4. The apparatus of claim 3 including means for combining said input signal with the generated output signal.

5. The apparatus of claim 3 wherein said means for generating said reference signal includes means for selecting a predetermined percentage of the voltage stored by said storing means to permit selective phase displacement between said input signal and said output signal.

6. The apparatus of claim 1 wherein said reference signal generating means includes means for selecting a plurality of different predetermined percentages of the amplitude of said reference signal and wherein said output signal generating means includes means for generating an output signal in response to the substantial equality of the amplitude of said comparing signal with each of said selected percentages.

7. The apparatus of claim 6 wherein said means for generating said reference signal includes:

means for generating binary signals related in duration to said period of time;

means for charging a capacitor at a substantially linear rate responsively to a first binary signal from said binary signal generating means;

means for storing the value of the voltage on said capacitor after said period of time;

wherein said means for generating said comparing signal includes:

means for discharging and charging said capacitor responsively to binary signals generated by said binary signal generating means subsequent to the generation of said first binary signal;

and including:

means for generating an electrical pulse at the beginning of said period of time;

means for generating an electrical pulse at the end of said period of time, the duration of said generated electrical pulses being less than the duration of said period of time; and, means for combining said generated electrical pulses with said output signal.

8. Apparatus comprising:

means for successively charging and discharging a capacitor at a predetermined rate during successive interpulse periods of a series of pulses to develop a varying voltage across the capacitor;

means for storing the voltage across the capacitor at the end of one of said interpulse periods;

means for comparing a portion of the stored voltage with the voltage across the capacitor during a subsequent interpulse period; and, means for generating a pulse responsively to the comparing means.

9. The apparatus of claim 8 including means for combining said generated pulse with said series of pulses to thereby increase the repetition frequency of said series of pulses.

10. The apparatus of claim 8 wherein said portion of the stored voltage is selectable to permit selective phase displacement between said generated pulse and the pulses in said series of pulses.

11. The apparatus of claim 8 wherein said means for successively charging and discharging said capacitor comprises:

a positive constant current source connected to said capacitor;

a negative constant current source connected to said capacitor; and, means for alternately enabling said constant current source during successive interpulse periods.

12. The apparatus of claim 11 wherein said means for successively charging and discharging said capacitor includes means for returning the voltage across said capacitor to the same initial voltage at the end of those interpulse periods during which the capacitor is discharged.

13. The apparatus of claim 12 including means for combining said generated pulse with said series of pulses to thereby increase the repetition frequency of said series of pulses.

14. The apparatus of claim 12 wherein said portion of stored voltage is selectable to permit selective phase displacement between said generated pulse and the pulses in said series of pulses.

15. Apparatus for generating a pulse displaced in phase from a pulse in a periodic signal independently of variations in the pulse repetition rate of the input signal comprising:

means for generating a reference signal related in amplitude to the interpulse period of an input signal;

means for generating a comparing signal having a rate of change related to the amplitude of the reference signal divided by the same interpulse period of the input signal to which the reference signal is related; and, means for generating an output signal in response to the reference signal and the comparing signal.

16. Apparatus for generating a pulse displaced in phase from a pulse in a periodic signal independently of variations in the pulse repetition rate of the input signal comprising:

means for generating a reference signal related in amplitude to an interpulse period of the input signal;

means for generating a comparing signal varying in amplitude from a value related to the reference signal toward zero; and, means for generating an output pulse responsively to said reference signal and said comparing signal.

17. A method for generating a signal displaced in phase from an input signal comprising the steps of:

generating a reference signal related in amplitude to the repetition frequency of the input signal;

generating a comparing signal having an amplitude which varies at a predetermined rate for a period of time related in duration to the repetition frequency of the input signal; and, generating an output signal in response to substantial equality of the amplitude of the varying signal and the amplitude of the reference signal.

18. The method of claim 17 including the step of combining the input signal with the generated output signal whereby the frequency of the combined signal is greater than the frequency of the input signal.

19. The method of claim 17 wherein the reference signal is generated by:

charging a capacitor at a substantially linear rate for a period of time related to the repetition frequency of the input signal;

storing the voltage on the capacitor after said period of time;

wherein the comparing signal is generated by:

charging and discharging a capacitor at the substantially linear rate for the period of time; and wherein the output signal is generated by:

comparing a predetermined percentage of the reference signal with the comparing signal; and, generating a pulse when the compared signals are substantially equal.

20. A method for increasing the repetition frequency of an input signal comprising the steps of:

charging a capacitor at a predetermined rate for a period of time related in duration to the repetition frequency of said input signal;

sampling the voltage on said capacitor after said period of time to establish a reference voltage;

thereafter discharging said capacitor at said predetermined rate;

comparing the voltage of said capacitor with at least one voltage level related to a predetermined percentage of said established reference voltage;

generating an output signal when the voltage on said capacitor is substantially equal to each of the established voltage levels; and, combining said output signal with said input signal whereby the repetition frequency of said combined signal is equal to the repetition frequency of said input signal multiplied by (N + 1) where N is the number of said voltage levels compared.

21. A method for generating a pulse displaced in phase from a pulse in a periodic input signal independently of variations in the pulse repetition rate of the input signal comprising the steps of:

generating a reference signal related in amplitude to an interpulse period immediately preceding the generation of the comparing signal;

generating a comparing signal having a rate of change related to the amplitude of the reference signal divided by the interpulse period of the input signal to which the reference signal is related; and, generating an output signal in response to the reference signal and the comparing signal.

22. A method for generating a pulse displaced in phase from a pulse in a periodic input signal independently of variations in the pulse repetition rate of the input signal comprising the steps of:

generating a reference signal related in amplitude to an interpulse period of the input signal;

generating a comparing signal of one polarity varying in amplitude from a value related to the reference signal toward a value of the opposite polarity and varying in amplitude at a rate related both to the amplitude of the reference signal and to the same interpulse period to which the reference signal is related; and, generating an output pulse responsively to said reference signal and said comparing signal.

23. A method of generating a plurality of pulses selectively displaced in phase from a pulse in a periodic input signal independently of variations in the pulse repetition rate of the input signal comprising the steps of:

establishing a plurality of reference signals each selectively related in amplitude to the pulse repetition rate of the input signal;

generating a comparing signal varying in amplitude at a rate related to the pulse repetition rate of the input signal;

comparing the amplitude of the varying amplitude comparing signal with the amplitude of each of the reference signals; and, generating an output pulse responsively to the comparing of the equal amplitude of the comparing signal and each of the reference signals.

* * * * *